(12) United States Patent
Henning et al.

(10) Patent No.: US 7,905,085 B2
(45) Date of Patent: Mar. 15, 2011

(54) METHOD FOR OPERATING AN INTERNAL COMBUSTION ENGINE AND DEVICE FOR EXECUTING THE METHOD

(75) Inventors: Ruben-Sebastian Henning, Stuttgart (DE); Ulrich Pechtold, Schwieberdingen (DE); Horst Fuhrmann, Grossbottwar (DE); Guenter Schelkle, Baltmannsweiler (DE); Seigfried Zerbin, Hinterlintal (DE)

(73) Assignee: Robert Bosch GmbH, Stuttgart (DE)

( * ) Notice: Subject to any disclaimer, the term of this patent is extended or adjusted under 35 U.S.C. 154(b) by 1173 days.

(21) Appl. No.: 11/349,618

(22) Filed: Feb. 7, 2006

(65) Prior Publication Data
US 2006/0196170 A1 Sep. 7, 2006

(30) Foreign Application Priority Data
Mar. 2, 2005 (DE) .................. 10 2005 009 464

(51) Int. Cl.
*F01N 3/00* (2006.01)
(52) U.S. Cl. ............... 60/277; 60/274; 60/286; 60/299; 60/301
(58) Field of Classification Search .......... 60/286, 60/293, 295, 277, 299, 301, 303
See application file for complete search history.

(56) References Cited

U.S. PATENT DOCUMENTS

| | | | |
|---|---|---|---|
| 6,209,315 B1* | 4/2001 | Weigl | 60/274 |
| 7,065,958 B2* | 6/2006 | Funk et al. | 60/286 |
| 2003/0033799 A1* | 2/2003 | Scheying | 60/286 |
| 2003/0061805 A1* | 4/2003 | Hirooka et al. | 60/289 |

FOREIGN PATENT DOCUMENTS

| | | |
|---|---|---|
| DE | 101 39 142 | 2/2003 |
| DE | 101 59 849 | 6/2003 |
| DE | 10 2004 018 221 | 11/2005 |
| DE | 10 2004 044 506 | 3/2006 |

* cited by examiner

*Primary Examiner* — Binh Q. Tran
*Assistant Examiner* — Jesse Bogue
(74) *Attorney, Agent, or Firm* — Kenyon & Kenyon LLP

(57) ABSTRACT

A method for operating an internal combustion engine, in whose exhaust gas system an exhaust gas treatment device is positioned, a reagent, which is possibly mixed with compressed air, being introduced into the exhaust gas system upstream from the exhaust gas treatment device, and a device for performing the method. The reagent is brought to a predefined reagent setpoint pressure using a reagent pump and subsequently metered using a reagent dosing valve. The reagent pressure existing upstream from the reagent dosing valve is detected. In the framework of a diagnosis, a time curve of the reagent setpoint pressure is predefined. The reagent pressure detected during the diagnosis is compared to at least one predefined threshold value. If the threshold value is exceeded, an error signal is provided. The corresponding diagnosis of a compressed air path may be provided alternatively or additionally to the diagnosis of the reagent path.

21 Claims, 2 Drawing Sheets

METHOD FOR OPERATING AN INTERNAL COMBUSTION ENGINE AND DEVICE FOR EXECUTING THE METHOD

FIELD OF THE INVENTION

The present invention relates to a method for operating an internal combustion engine, in whose exhaust gas system an exhaust gas treatment device is positioned, and in which a reagent is introduced into the exhaust gas system upstream from the exhaust gas treatment device, possibly mixed with compressed air, and a device for executing the method.

BACKGROUND INFORMATION

An exhaust gas treatment device of an internal combustion engine, in which an SCR catalytic converter (selective catalytic reduction), which reduces the nitrogen oxides contained in the exhaust gas to nitrogen using the reducing agent ammonia, is used to reduce the NOx emissions, is described in German Patent Application No. DE 101 39 142. The ammonia is obtained from a urea-water solution in a hydrolysis catalytic converter positioned upstream from the SCR catalytic converter. The hydrolysis catalytic converter converts the urea contained in the urea-water solution with water into ammonia and carbon dioxide. To ensure exact dosing, the concentration of the urea-water solution is ascertained. The urea-water solution is brought to a predefined pressure using a pump. A dosing valve-fixes a predefined flow rate. Compressed air is mixed with the urea-water solution in a mixing chamber. The urea-water solution is sprayed together with the added air into the exhaust gas of the internal combustion engine in such a way that a largely uniform flow against the SCR catalytic converter is achieved.

A method and a device, in which a pressurized reagent is also sprayed into the exhaust gas of an internal combustion engine upstream from an SCR catalytic converter, are described in German Patent Application No. DE 10 2004 018 221 (not previously published). The reagent pressure is fixed at a predefined reagent setpoint pressure as a function of a characteristic quantity. An operating variable of the internal combustion engine and/or a characteristic quantity of the exhaust gas of the internal combustion engine may be used as the characteristic quantity. The predefined reagent pressure setpoint value is regulated during a regulation in which the reagent actual pressure is detected by a reagent pressure sensor. Compressed air may be added to the reagent. The compressed air pressure may also be regulated to a predefined compressed air pressure setpoint value as a function of a characteristic quantity during a regulation, the compressed air actual pressure being detected by a compressed air pressure sensor. A defect of at least one of the pressure sensors may result in reduced performance capability of the SCR catalytic converter, with the consequence that unpurified exhaust gas may reach the environment.

A method and a device, in which a pressurized reagent is sprayed into the exhaust gas of an internal combustion engine upstream from an SCR catalytic converter, are described in German Patent Application No. DE 10 2004 044 506 (not previously published). The compressed air is guided via a check valve which has an opening pressure. It provides for diagnostics of the compressed air pressure beginning at a starting instant with the closing of a compressed air regulating valve. A check is performed at at least a second instant to determine whether the compressed air pressure corresponds at least to a lower threshold value, which at least approximately corresponds to the opening pressure of the check valve added to the ambient air pressure. An error signal is provided when the condition is not fulfilled.

A further method and a device, in which a pressurized reagent is sprayed into the exhaust gas of an internal combustion engine upstream from an SCR catalytic converter, are described in German Patent Application No. DE 101 59 849. Fuel which acts as a reducing agent for the $NO_2$ component in the exhaust gas in particular is provided as the reagent.

The present invention is based on the object of providing a method for operating an exhaust gas treatment device of an internal combustion engine, in whose exhaust gas system an exhaust gas treatment device is positioned, and in which a reagent, which is possibly admixed with compressed air, is introduced into the exhaust gas system upstream from the exhaust gas treatment device, and a device for executing the method, which ensure high reliability.

SUMMARY OF THE INVENTION

The method according to the present invention for operating an internal combustion engine first provides that a reagent is introduced into the exhaust gas system upstream from an exhaust gas treatment device. A reagent pump brings the reagent to a predefined reagent setpoint pressure. The reagent is dosed using a reagent dosing valve. The reagent pressure is detected upstream from the reagent dosing valve. During diagnostics, in which the reagent setpoint pressure has a predefined time curve, the detected reagent pressure is compared to at least one threshold value in at least one predefined state of the reagent dosing valve. If the threshold is exceeded, an error signal is provided.

The method according to the present invention is alternatively or additionally suitable for diagnosing a compressed air path. The compressed air path contains a compressed air pump and a compressed air valve and provides for the detection of the compressed air pressure.

The method according to the present invention significantly increases the reliability during operation of the internal combustion engine through the evaluation of the reagent and/or compressed air pressure, in particular if the reagent, such as fuel, is easily flammable. A leak in the reagent and/or compressed air path may be discovered using the method according to the present invention. Furthermore, it is possible to check at least one valve positioned in the reagent and/or compressed air path, which may stick in the closed or at least partially open state in case of fault. The method according to the present invention ensures that the exhaust gas treatment device is ready for use on the basis of the diagnostics and that a required exhaust gas purification is maintained.

According to one embodiment, a periodic time curve of the reagent setpoint pressure and/or of the compressed air setpoint pressure is predefined. This measure makes it possible to fix the at least one threshold value and/or threshold value curve easily. In normal dosing operation, in which the reagent dosing valve and/or the compressed air valve is at least partially open, it may be checked whether the predefined time curve is reflected in the reagent pressure and/or compressed air pressure. For example, predefining a sinusoidal time curve of the reagent setpoint pressure and/or the compressed air setpoint pressure is suitable. Furthermore, predefining a pulsed time curve of the reagent setpoint pressure and/or the compressed air setpoint pressure is suitable.

According to one embodiment, an operating state of the reagent dosing valve, in which the valve is closed, is predefined, and the threshold value is adjusted to the maximum predefined reagent setpoint pressure. Using this measure, it may be checked whether there is a leak in the reagent path or whether the reagent dosing valve sticks in the at least partially open state. A possibly occurring pressure drop may be established by ascertaining the pressure gradient or at least one pressure differential quotient and a subsequent comparison to at least one threshold value.

According to one embodiment, an operating state of the reagent dosing valve, in which the valve is at least partially open, is predefined, and the threshold value is adjusted to the expected time curve. Using this measure, it may be checked whether the reagent dosing valve sticks in the closed state.

Corresponding embodiments are possible in the compressed air path if the compressed air valve is electrically controllable. Otherwise, the threshold value is adjusted to the maximum compressed air setpoint pressure. Therefore, it may at least be determined whether the compressed air valve sticks in the closed state. Furthermore, according to one embodiment, the threshold value may be adjusted to the expected time curve of the predefined compressed air setpoint pressure. Therefore, it may also be determined whether the compressed air valve sticks in the closed state.

One embodiment provides for the checking of a reagent pump and/or a compressed air pump.

The device according to the present invention for operating an internal combustion engine primarily relates to a control unit which is implemented to perform the method.

In particular, the control unit contains a diagnostic controller, a threshold value default for predefining the time curve of the setpoint pressure, and a comparator, which compares the at least one threshold value to the detected pressure.

The control unit preferably contains at least one electrical memory, in which the method steps are stored as a computer program.

DETAILED DESCRIPTION

Figure 1:
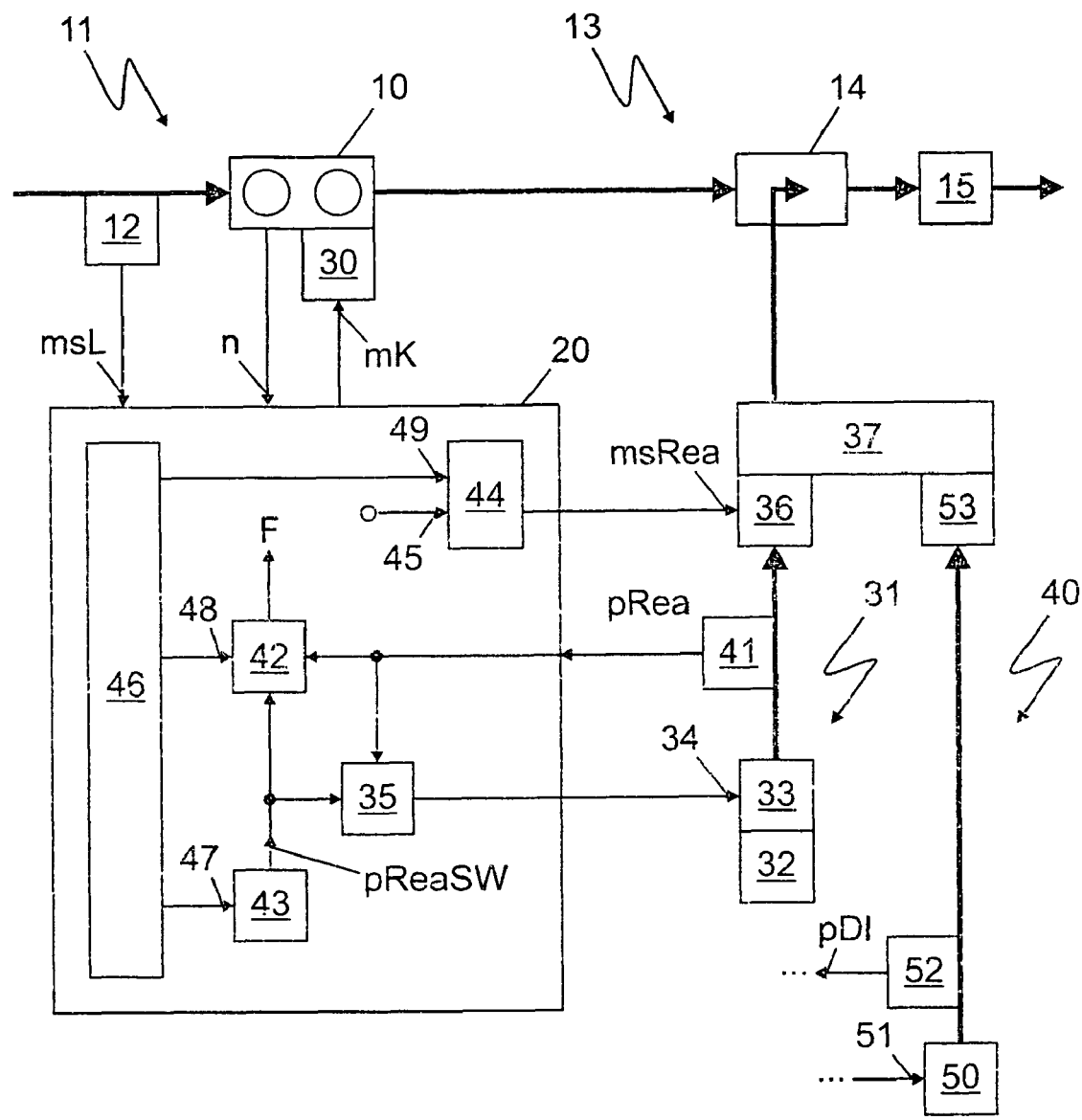
FIG. 1 shows a technical environment in which a method according to the present invention is executed.

FIG. 1 shows an internal combustion engine 10, in whose intake area 11 an intake air detector 12 is positioned and in whose exhaust gas system 13 a reagent introduction device 14 and an exhaust gas treatment device 15 are positioned.

Intake air detector 12 outputs an air signal msL to a control unit 20 and internal combustion engine 10 outputs a speed n to control unit 20.

Control unit 20 provides a fuel signal mK to a fuel metering device 30.

In a reagent path 31, a reagent stored in a reagent tank 32 is brought to a predefined reagent setpoint pressure pReaSW by a reagent pump 33. Reagent pump 33 is activated by a reagent pump activation signal 34, which is provided by a reagent pump activator 35 positioned in control unit 20.

The reagent reaches a reagent dosing valve 36, which is connected to a mixing chamber 37. Furthermore, mixing chamber 37 is connected to a compressed air path 40. After mixing chamber 37, the reagent reaches reagent introduction device 14.

A reagent pressure sensor 41, which provides reagent pressure pRea to both reagent pump activator 35 and also a comparator 42, is positioned between reagent pump 33 and reagent dosing valve 36. Comparator 42 provides an error signal F.

A setpoint default 43 provides a reagent setpoint pressure pReaSw to both reagent pump activator 35 and also comparator 42.

A dosing valve activation signal msRea, provided by a reagent dosing controller 44, to which a dosing signal 45 is supplied, is applied to reagent dosing valve 36.

A diagnostic controller 46 outputs a setpoint default signal 47 to setpoint default 43, a comparison signal 48 to comparator 42, and a diagnostic signal 49 to reagent dosing controller 44.

Compressed air path 40 contains a compressed air pump 50 to which a compressed air pump activation signal 51 is applied, a compressed air pressure sensor 52, which provides a compressed air pressure pDI, and a compressed air valve 53, which is positioned on mixing chamber 37.

Figure 2A:
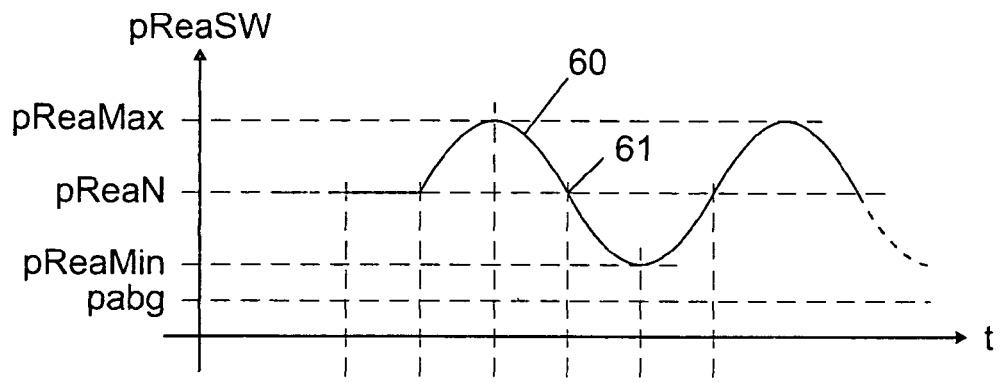
FIGS. 2a, 2b and 2c show signal curves as a function of time.

FIG. 2a shows a predefined reagent setpoint pressure pReaSW as a function of time t. Between first and second instants t1, t2, a reagent nominal pressure pReaN is predefined as reagent setpoint pressure pReaSW. A time curve 60 of reagent setpoint pressure pReaSW is predefined at second instant t2. Time curve 60 has a maximum pReaMax at a third instant t3, a relative zero crossing 61 at a fourth instant t4, and a minimum pReaMin at a fifth instant t5. Minimum pReaMin is above an exhaust gas pressure pabg.

Figure 2B:
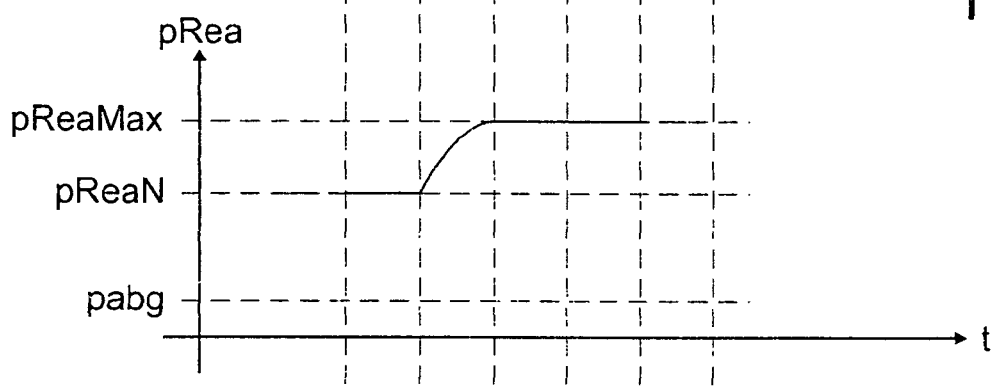

FIG. 2b shows reagent pressure pRea as a function of time t. Between first and second instants t1, t2, reagent pressure pRea is predefined reagent nominal pressure pReaN. Between second and third instants t2, t3, reagent pressure pRea rises to maximum pReaMax of predefined reagent setpoint pressure pReaSW.

Figure 2C:
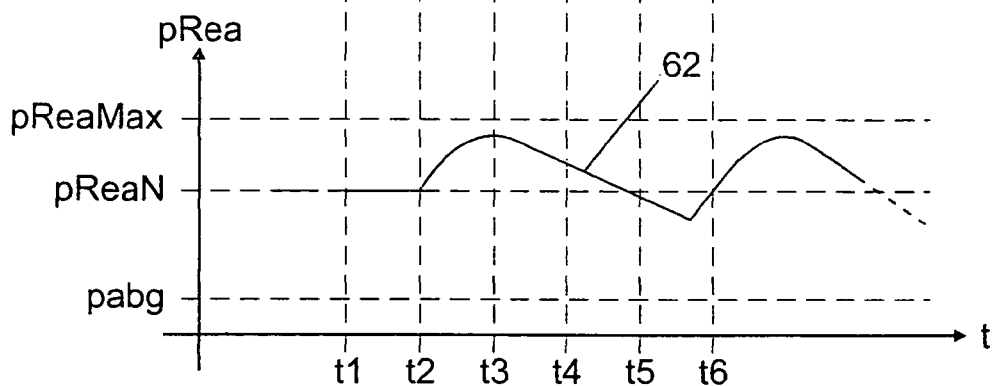

FIG. 2c also shows reagent pressure pRea as a function of time t. Reagent pressure pRea is predefined reagent nominal pressure pReaN between first and second instants t1, t2. Between second and third instants t2, t3, reagent pressure pRea rises to just below predefined maximum pReaMax of reagent setpoint pressure pReaSW.

Reagent pressure pRea has a pressure drop 62 between third and sixth instants t3, t6.

The method according to the present invention functions as follows:

The exhaust gas of internal combustion engine 10 contains undesired components such as nitrogen oxides. Exhaust gas treatment device 15 is responsible for reducing the undesired components as much as possible. Exhaust gas treatment device 15 is implemented as a catalytic converter, preferably as an SCR catalytic converter according to the related art cited at the beginning, for example. An SCR catalytic converter requires the reagent such as ammonia. Hydrocarbons may be provided as a reagent as a function of the design of the SCR catalytic converter. The ammonia may be obtained from a urea-water solution through hydrolysis. Possibly necessary hydrocarbons may be provided by fuel.

In the exemplary embodiment shown, the reagent may be mixed in mixing chamber 37 with compressed air which is provided by compressed air path 40. Compressed air path 40 and mixing chamber 37 may be dispensed with as a function of the concrete design. According to another embodiment, reagent introduction device 14, which is simply a spray pipe, for example, may be identical to reagent dosing valve 36. Reagent dosing valve 36 is then dispensed with. In this design, reagent dosing valve 36 is positioned directly in exhaust gas system 13.

Reagent pressure sensor 41 detects reagent pressure pRea in reagent path 31 between reagent pump 33 and reagent dosing valve 36.

Compressed air pump 50, whose pressure is fixed at a predefined compressed air setpoint pressure pDISW using compressed air pump activation signal 51, is provided in compressed air path 40. The compressed air reaches mixing chamber 37 via compressed air valve 53. Compressed air valve 53 is a check valve, for example, which has a flow-dependent opening pressure. According to an embodiment which is not shown in greater detail, compressed air valve 53 may be electrically actuated. Compressed air pressure sensor 52, which detects compressed air pressure pDI in compressed air path 40, is positioned between compressed air pump 50 and compressed air valve 53.

The following description is directed to a diagnosis of reagent path 31. The diagnosis of compressed air path 40 is performed analogously. Reagent pump 33 contained in reagent path 31 corresponds to compressed air pump 50 positioned in compressed air path 40. Reagent dosing valve 36 positioned in reagent path 31 corresponds to compressed air valve 53 positioned in compressed air path 40, and reagent pressure sensor 41 positioned in reagent path 31 corresponds to compressed air pressure sensor 52 positioned in compressed air path 40. Reagent setpoint pressure pReaSW predefined in reagent path 31 corresponds to compressed air setpoint value pDISW predefined in compressed air path 40.

A diagnosis through an evaluation of reagent pressure pRea provided by reagent pressure sensor 41 in regard to the absolute value and/or the changes first allows a check of whether there is a leak in reagent path 31. A leak, in particular a leak which occurs in exhaust gas system 13, may entail increased operating danger, in particular if the reagent is an easily flammable material such as fuel.

Reagent pressure pRea is evaluated in comparator 42 by comparison to at least one predefined threshold value, which may be an absolute pressure and/or a pressure change and/or a pressure gradient. A targeted diagnosis, which extends to the proper functioning of reagent dosing valve 36 or another valve provided, may be performed via suitable fixing of diagnostic signal 49 by diagnostic controller 46. Furthermore, reagent pump 33 may be checked for proper functioning.

During normal operation of exhaust gas treatment device 15, the dosing is performed using dosing signal 45, which is supplied to reagent dosing controller 44. The normal dosing operation may be interrupted by diagnostic signal 49, which is provided by diagnostic controller 46.

It is first assumed that the normal dosing operation of the reagent is provided between first and second instants t1, t2. Setpoint default 43 outputs reagent pressure nominal value pReaN, which reagent pump activator 35 attempts to set via corresponding fixing of reagent pump activation signal 34.

A first diagnostic possibility is checking whether reagent pressure pRea at least approximately corresponds to predefined reagent nominal pressure pReaN. Comparator 42 compares reagent pressure pRea to a threshold value or multiple threshold values, which are related to predefined reagent nominal pressure pReaN. If a deviation is determined, error signal F is provided.

Time curve 60 of reagent setpoint pressure pReaSW, which is preferably superimposed on predefined reagent nominal pressure pReaN, is predefined starting from second instant t2. A periodic, sinusoidal curve 60, which may generally be provided without increased demands on reagent pump 33, is provided in the exemplary embodiment shown. Reagent pump 33 must merely be capable of providing a reagent pressure pRea which exceeds reagent nominal pressure pReaN. Furthermore, a pulsed curve 60, which places higher demands on reagent pump 33, is suitable. Purely in principle, any curve 60 which has a chronological change may be provided.

It is first assumed that reagent dosing valve 36 is at least partially open during normal dosing operation. Reagent pressure pRea is evaluated in that comparator 42 compares measured reagent pressure pRea to at least one threshold value, preferably to a time curve of the threshold value corresponding to curve 60, the threshold value or the threshold value curve being adapted to predefined curve 60 and possibly to reagent nominal pressure pReaN. If the signal curve of reagent pressure pRea shown in FIG. 2b occurs, in which predefined time curve 60 may no longer be found again at least from third instant t3, a reagent dosing valve 36 which sticks in the closed state must be assumed.

Another diagnosis provides that reagent dosing valve 36 is closed at second instant t2 or at the latest at third instant t3. If reagent path 31 is in working order, reagent pressure pRea rises to predefined maximum pReaMax of reagent setpoint pressure pReaSW, as shown in FIG. 2b, and subsequently remains there. For the diagnosis, it is sufficient if comparator 42 checks whether a pressure drop of reagent pressure pRea has occurred at at least one predefined instant, for example, at fourth instant t4, at which relative zero crossing 61 lies, and/or at fifth instant t5, at which minimum pReaMin lies. Comparator 42 may relate the threshold value to maximum pReaMax, for example. If no pressure drop or only a small permissible pressure drop is determined, reagent path 31 is in working order. If predefined time curve 60, possibly having significantly reduced amplitudes, may be found again, reagent dosing valve 36 sticks in the at least partially open state. If there is a leak in reagent path 31, a reagent pressure pRea will occur as shown as an example in FIG. 2c.

The situation may first occur in which reagent pressure pRea does not rise to expected maximum pReaMax at third instant t3. If this is the case, a larger leak must be assumed, in which reagent pump 33 is no longer capable of maintaining predefined reagent setpoint pressure pReaSW.

After third instant t3, i.e., after reaching maximum pReaMax, pressure drop 62 exists, which is ended in the exemplary embodiment shown from sixth instant t6 of predefined time curve 60 by the pressure increase. In addition to a comparison with a threshold value, for example, at fourth and/or fifth instant t4, t5, a pressure gradient which may preferably be implemented as at least one differential quotient may be provided as a threshold value.

If comparator 42 determines the threshold has been exceeded at least once, error signal F is provided and may be stored in a fault memory (not shown in greater detail) or displayed, for example.

What is claimed is:

1. A method for operating an internal combustion engine, in whose exhaust gas system an exhaust gas treatment device is situated, the method comprising:
   introducing a reagent into the exhaust gas system upstream from the exhaust gas treatment device;
   using a reagent pump for bringing the reagent to a predefined reagent setpoint pressure that is set to a nominal reagent pressure during a dosing of the reagent;
   performing the dosing of the reagent using a reagent dosing valve;
   detecting a reagent pressure upstream from the reagent dosing valve, the reagent setpoint pressure having a predefined time curve during a diagnosis, wherein the curve is superimposed on the nominal reagent pressure;
   comparing the reagent pressure, which is detected in at least one predefined state of the reagent dosing valve, to at least one threshold value associated with the nominal reagent pressure after taking into account the curve of the reagent setpoint pressure; and providing an error signal if the reagent pressure exceeds the threshold value.

2. The method according to claim 1, further comprising predefining a periodic time curve of the setpoint pressure.

3. The method according to claim 1, further comprising predefining a sinusoidal time curve of the setpoint pressure.

4. The method according to claim 1, further comprising predefining a pulsed time curve of the setpoint pressure.

5. The method according to claim 1, further comprising predefining an operating state of the reagent dosing valve, in which the reagent dosing valve is closed, and the threshold value is adjusted to a maximum of the reagent setpoint pressure.

6. The method according to claim 1, further comprising predefining an operating state of the reagent dosing valve, in which the reagent dosing valve is at least partially open, and the threshold value is adjusted to an expected time curve.

7. The method according to claim 1, wherein the comparison is performed at least one predefined instant after a starting instant of the predefined time curve of the setpoint pressure.

8. The method according to claim 1, wherein the predefined instant corresponds to a time at which the reagent setpoint pressure is equal to one of a nominal reagent pressure value and a minimum reagent pressure value, the minimum reagent pressure value being above an exhaust gas pressure.

9. A method for operating an internal combustion engine, in whose exhaust gas system an exhaust gas treatment device is situated, the method comprising:
    introducing compressed air into the exhaust gas system upstream from the exhaust gas treatment device;
    using a compressed air pump for bringing the compressed air to a predefined compressed air setpoint pressure that is set to a nominal air pressure during a dosing of the air;
    performing the dosing of the compressed air using a compressed air valve;
    detecting a compressed air pressure upstream from the compressed air valve, the compressed air setpoint pressure having a predefined time curve during a diagnosis, wherein the curve is superimposed on the nominal air pressure;
    comparing the compressed air pressure, which is detected in at least one predefined state of the compressed air valve, to at least one threshold value associated with the nominal air pressure after taking into account the curve of the compressed air setpoint pressure; and
    providing an error signal if the compressed air pressure exceeds the threshold value.

10. The method according to claim 9, further comprising predefining a periodic time curve of the setpoint pressure.

11. The method according to claim 9, further comprising predefining a sinusoidal time curve of the setpoint pressure.

12. The method according to claim 9, further comprising predefining a pulsed time curve of the setpoint pressure.

13. The method according to claim 9, further comprising adjusting the threshold value to a maximum of the compressed air setpoint pressure.

14. The method according to claim 9, further comprising adjusting the threshold value to an expected time curve of the predefined compressed air setpoint pressure.

15. The method according to claim 9, wherein the comparison is performed at least one predefined instant after a starting instant of the predefined time curve of the setpoint pressure.

16. The method according to claim 9, wherein the predefined instant corresponds to a time at which the compressed air setpoint pressure is equal to one of a nominal compressed air pressure value and a minimum compressed air pressure value.

17. A device for operating an internal combustion engine, in whose exhaust system an exhaust gas treatment device is situated, the device comprising:
    means for introducing a reagent into the exhaust gas system upstream from the exhaust gas treatment device;
    a reagent pump bringing the reagent to a predefined reagent setpoint pressure, which is set to a nominal reagent pressure during a dosing of the reagent;
    a reagent dosing valve performing the dosing of the reagent;
    means for detecting a reagent pressure upstream from the reagent dosing valve, the reagent setpoint pressure having a predefined time curve during a diagnosis, wherein the curve is superimposed on the nominal reagent pressure; and
    at least one control unit for comparing the reagent pressure, which is detected in at least one predefined state of the reagent dosing valve, to at least one threshold value associated with the nominal reagent pressure after taking into account the curve of the reagent setpoint pressure, and for providing an error signal if the reagent pressure exceeds the threshold value.

18. The device according to claim 17, wherein the control unit contains a diagnostic controller, a setpoint default for the predefined time curve of the setpoint pressure, and a comparator for comparing the detected pressure to the at least one threshold value.

19. A device for operating an internal combustion engine, in whose exhaust system an exhaust gas treatment device is situated, the device comprising:
    means for introducing compressed air into the exhaust gas system upstream from the exhaust gas treatment device;
    a compressed air pump for bringing the compressed air to a predefined compressed air setpoint pressure that is set to a nominal air pressure during a dosing of the air;
    a compressed air valve for performing the dosing of the compressed air;
    means for detecting a compressed air pressure upstream from the compressed air valve, the compressed air setpoint pressure having a predefined time curve during a diagnosis, wherein the curve is superimposed on the nominal air pressure; and
    at least one control unit for comparing the compressed air pressure, which is detected in at least one predefined state of the compressed air valve, to at least one threshold value associated with the nominal air pressure after taking into account the curve of the compressed air setpoint pressure, and for providing an error signal if the compressed air pressure exceeds the threshold value.

20. The device according to claim 19, wherein the control unit contains a diagnostic controller, a setpoint default for the predefined time curve of the setpoint pressure, and a comparator for comparing the detected pressure to the at least one threshold value.

21. A method, comprising:
    bringing one of air and a reagent, which is upstream of a valve in an exhaust gas system, to a nominal pressure using a pump controlled as a function of a setpoint pressure; and after bringing the upstream air/reagent to the nominal pressure and during a predefined operating state of the valve:
detecting an actual pressure of the upstream air/reagent;
varying the setpoint pressure over time, wherein the setpoint pressure influences the pressure of the upstream air/reagent when the valve is in an at least partially open state;

generating an error signal when the predefined operating state is the at least partially open state and the varying of the setpoint pressure fails to influence the upstream air/reagent pressure; and generating an error signal when the predefined operating state is a closed state and the varying of the setpoint pressure influences the upstream air/reagent pressure.

* * * * *